United States Patent
Feng et al.

(10) Patent No.: US 8,083,431 B2
(45) Date of Patent: Dec. 27, 2011

(54) MAGNETIC RING SYSTEMS FOR ATTACHMENT TO A SHAFT AND METHODS OF MAKING AND USING

(75) Inventors: Sainan Feng, Saginaw, MI (US); Mohammad Islam, Saginaw, MI (US); Matthew W. Mielke, Freeland, MI (US); Christian Ross, Hemlock, MI (US)

(73) Assignee: Nexteer (Beijing) Technology Co., Ltd.

( * ) Notice: Subject to any disclaimer, the term of this patent is extended or adjusted under 35 U.S.C. 154(b) by 116 days.

(21) Appl. No.: 12/102,971

(22) Filed: Apr. 15, 2008

(65) Prior Publication Data

US 2008/0254901 A1 Oct. 16, 2008

Related U.S. Application Data

(60) Provisional application No. 60/923,594, filed on Apr. 16, 2007.

(51) Int. Cl.
*F16B 7/04* (2006.01)
(52) U.S. Cl. .................................... 403/372; 403/DIG. 1
(58) Field of Classification Search .................. 403/365, 403/366, 372, DIG. 1, 377
See application file for complete search history.

(56) References Cited

U.S. PATENT DOCUMENTS

| | | | | |
|---|---|---|---|---|
| 2,767,339 | A * | 10/1956 | Hatfield | 310/162 |
| 2,989,327 | A * | 6/1961 | Hermanus | 403/372 |
| 3,578,364 | A * | 5/1971 | Ehrenberg | 403/370 |
| 3,679,245 | A * | 7/1972 | Ehrenberg | 403/372 |
| 3,738,591 | A * | 6/1973 | Melluish | 242/486.1 |
| 4,152,099 | A * | 5/1979 | Bingler | 417/420 |
| 4,166,622 | A * | 9/1979 | Rager | 369/270.1 |
| 4,272,872 | A * | 6/1981 | Hess et al. | 492/4 |
| 4,484,321 | A * | 11/1984 | Eisemann | 720/712 |
| 4,589,797 | A * | 5/1986 | Martins | 403/372 |
| 4,985,959 | A * | 1/1991 | Lieberman et al. | 15/230.11 |
| 5,236,274 | A * | 8/1993 | Taniguchi | 403/372 |
| 5,370,402 | A * | 12/1994 | Gardner et al. | 277/411 |
| 5,491,407 | A * | 2/1996 | Maxson et al. | 324/174 |
| 6,222,287 | B1 * | 4/2001 | Suzuki | 310/49.05 |
| 6,424,896 | B1 * | 7/2002 | Lin et al. | 701/41 |
| 7,188,533 | B2 * | 3/2007 | Pattok et al. | 73/799 |
| 7,563,050 | B2 * | 7/2009 | Strait | 403/365 |

* cited by examiner

*Primary Examiner* — Joshua Kennedy
(74) *Attorney, Agent, or Firm* — Cantor Colburn LLP

(57) ABSTRACT

Magnetic ring systems for attachment to a shaft and methods of making and using are provided. According to an embodiment, a magnetic ring system for attachment to a shaft comprises: a magnetic ring; and an adaptor configured to fit inside the magnetic ring, the adaptor comprising an inner wall spaced from an outer wall, wherein the inner wall comprises a plurality of grooves for engaging the shaft.

14 Claims, 4 Drawing Sheets

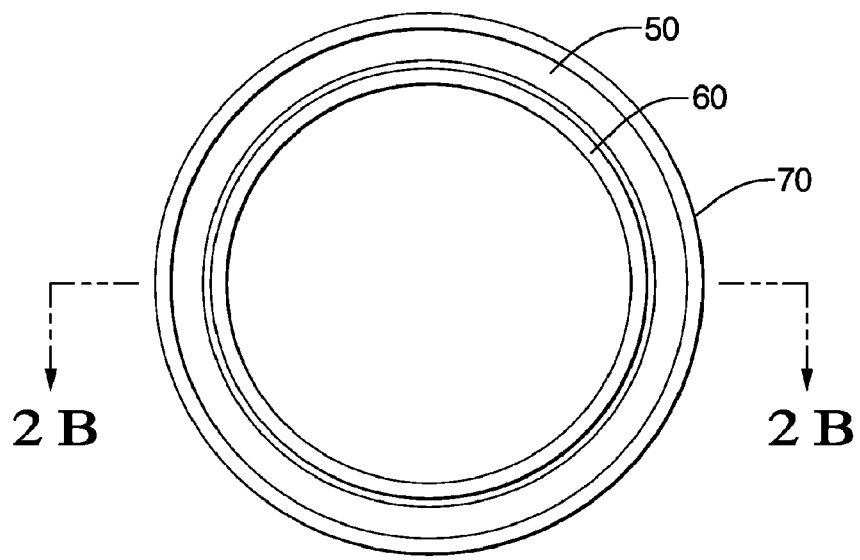
FIG. 2 A
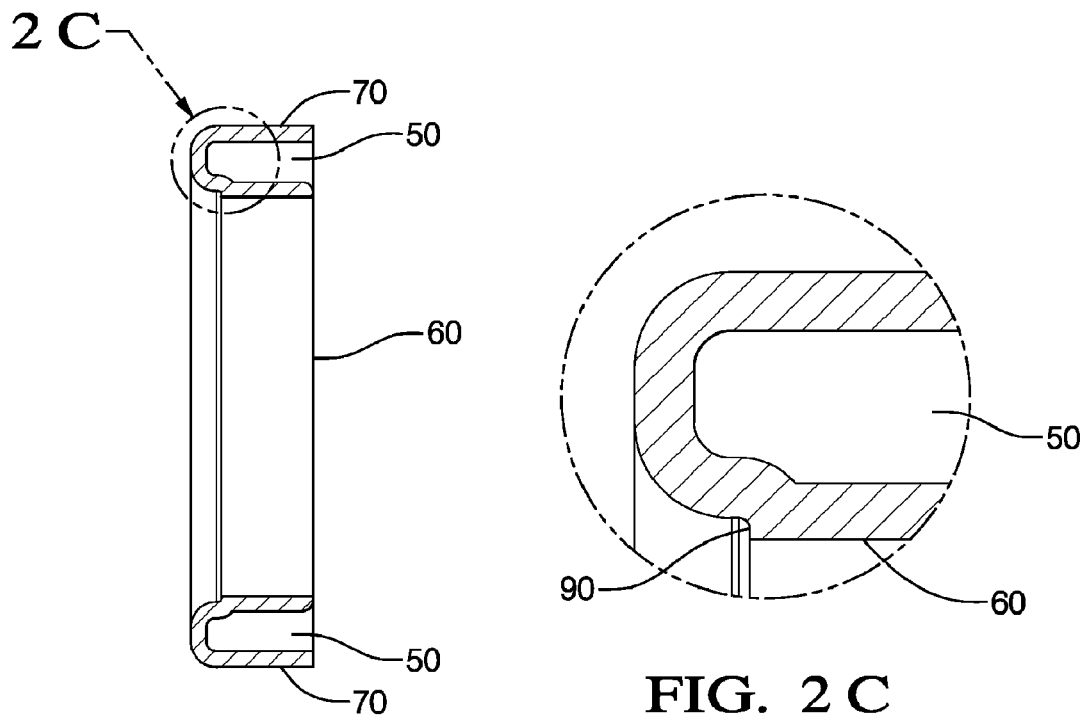
FIG. 2 B
FIG. 2 C

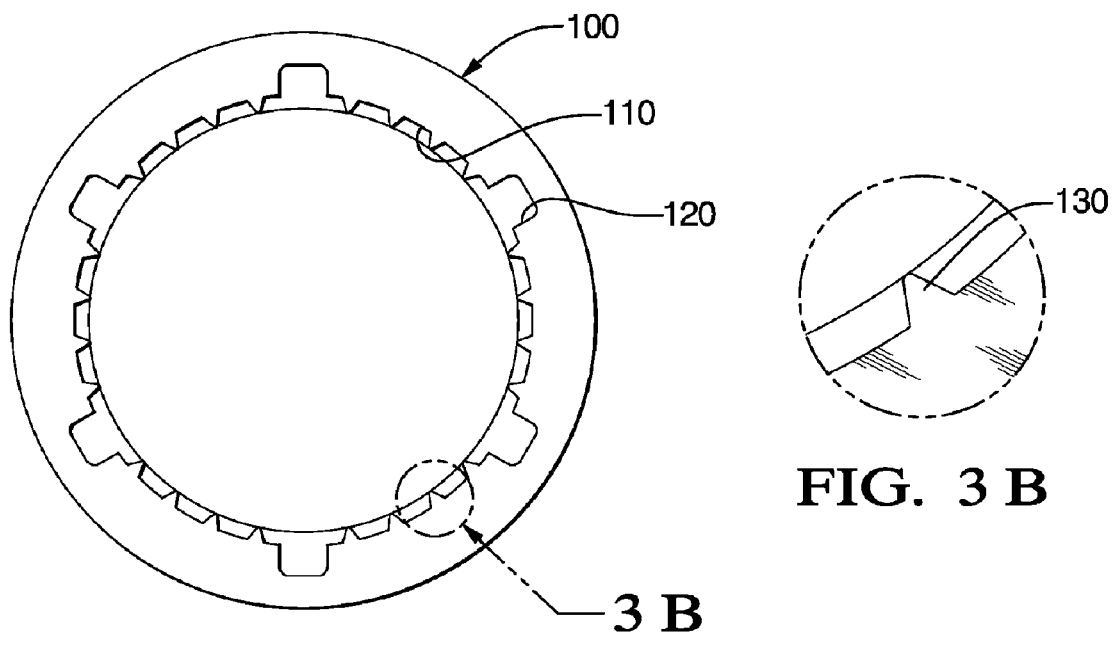
FIG. 3 A
FIG. 3 B
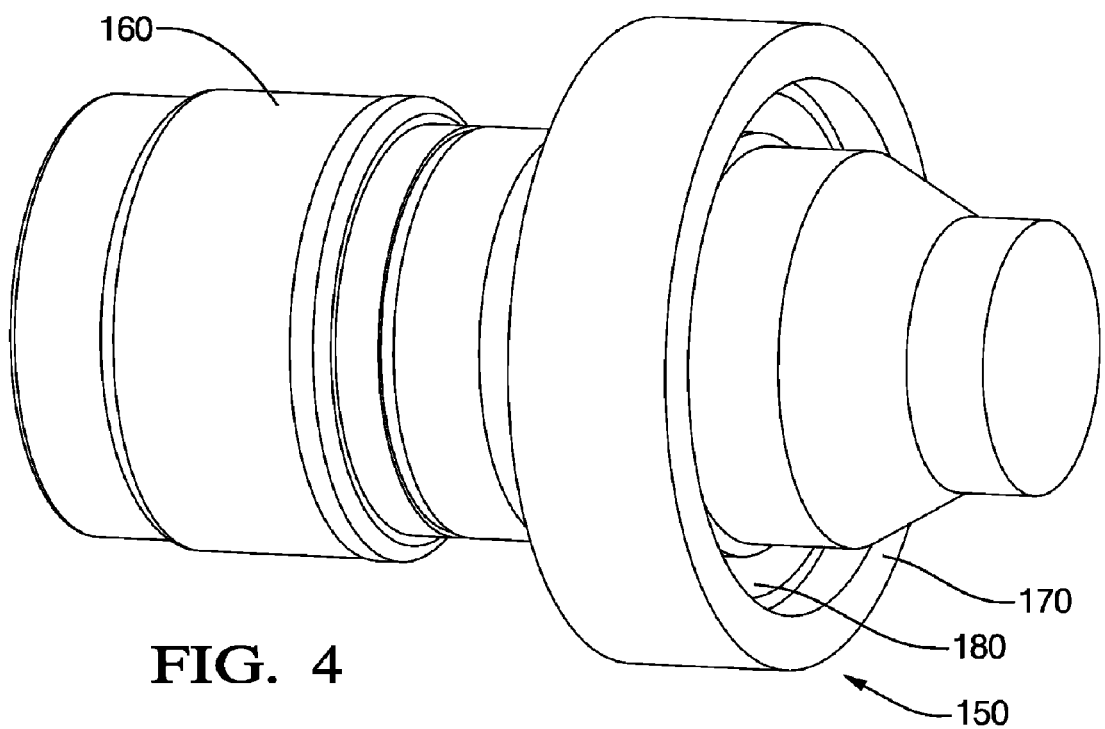
FIG. 4

MAGNETIC RING SYSTEMS FOR ATTACHMENT TO A SHAFT AND METHODS OF MAKING AND USING

CROSS REFERENCE TO RELATED APPLICATION

This application claims the benefit of U.S. Provisional Patent Application No. 60/923,594 filed Apr. 16, 2007, which is incorporated by reference herein in its entirety.

TECHNICAL FIELD

This application relates to sensing position and/or torque and, more particularly, to magnetic ring systems for attaching a magnetic ring to a shaft of a torque/position sensing device.

BACKGROUND OF THE INVENTION

It is frequently important to measure or sense an angular displacement and/or relative torque between two shafts. The relative displacement can be measured by a small angle displacement sensor. The relative displacement can then be used to derive the torque applied between the two shafts.

For example, power steering systems in motor vehicles, etc. are designed to provide appropriate hydraulic or electrical assist to allow a driver to complete a turn of the motor vehicle. The driver usually turns a steering wheel that is connected to a first shaft. The first shaft is coupled to a second shaft that is connected to a steering mechanism. The first and second shafts can be coupled together by a compliant member, such as a torsion bar. The first shaft can rotate with respect to the second shaft by a predetermined number of degrees, e.g., ±12 degrees. Mechanical stops can prevent further movement. The amount of assist is determined as a function of the amount of torque being applied to the first shaft.

Many types of position sensors require a ring magnet to be pressed onto a shaft. Unfortunately, the magnetic rings of such position sensors are composed of a brittle magnetic material that can crack during assembly. This assembly is particularly stressful to the magnetic material because it involves forcing each magnetic ring onto a shaft. The inner diameter of each magnetic ring is sized to fit tightly around the shaft to prevent it from sliding along the shaft. Unfortunately, attaching the magnetic ring to the shaft in this manner imparts hoop stresses on the magnetic ring that can cause it to fracture.

It is therefore desirable to develop an improved device for attaching the magnetic ring to the shaft of the rotor assembly without causing it to fracture.

SUMMARY OF THE INVENTION

Magnetic ring systems for attachment to a shaft and methods of making and using are disclosed herein. According to an embodiment, a magnetic ring system for attachment to a shaft comprises: a magnetic ring; and an adaptor configured to fit inside the magnetic ring, the adaptor comprising an inner wall spaced from an outer wall, wherein the inner wall comprises a plurality of grooves for engaging the shaft. This embodiment of the magnetic ring system can be formed by a method comprising: forming the plurality of grooves radially about the inner wall of the adaptor; and attaching the adaptor to the magnetic ring such that it fits snugly against an inside wall of the magnetic ring.

In another embodiment, a magnetic ring system for attachment to a shaft comprises: a magnetic ring; and an adaptor configured to fit inside the magnetic ring, the adaptor comprising an inner wall spaced from an outer wall and a groove between the inner wall and the outer wall. This embodiment of the magnetic ring system can be formed by a method comprising: forming the groove in the adaptor such that the groove extends at least partially around a circumference of the adaptor between the inner wall and the outer wall; and attaching the adaptor to the magnetic ring such that it fits snugly against an inside wall of the magnetic ring.

BRIEF DESCRIPTION OF THE DRAWINGS

Referring now to the figures, which are exemplary embodiments, and wherein like elements are numbered alike:

FIG. 1a is a top plan view of an adaptor configured to fit inside an inside wall of a magnetic ring for attaching the ring to a shaft in accordance with one embodiment;

FIG. 1b is a cross-sectional view of the adaptor along section B-B of FIG. 1a;

FIG. 1c is a detailed view of section A of the adaptor shown in FIG. 1a;

FIG. 2a is a top plan view of an alternative embodiment of the adaptor depicted in FIG. 1a;

FIG. 2b is a cross-sectional view of the adaptor along section B-B of FIG. 2a;

FIG. 2c is a detailed view of section B of the adaptor shown in FIG. 2b;

FIG. 3a is a top plan view of yet another embodiment of the adaptor depicted in FIG. 1a;

FIG. 3b is a detailed view of section A of the adaptor shown in FIG. 3a;

FIG. 4 is a perspective view of a shaft assembly comprising a magnetic ring attached to a shaft by an adaptor;

DESCRIPTION OF THE PREFERRED EMBODIMENTS

Magnetic ring systems for attaching a magnetic ring to a shaft and methods of making and using such systems are described herein. In an embodiment, the shaft is part of an apparatus for sensing position and/or torque as described in U.S. Pat. No. 7,188,533, which is incorporated herein by reference. It is contemplated that the magnetic ring could be employed in other types of devices such as a magnetic pump for displacing fluid, with the shaft being the pump housing.

The magnetic ring is shaped to fit snugly around the shaft to which it is to be attached. For example, it can be circular in shape if the shaft is cylindrical in shape. The magnetic ring includes a magnetic material. As used herein, the term "magnetic" refers to an ability to exhibit an attractive or repulsing force on other materials (i.e., magnetism). In an exemplary embodiment, the magnetic ring includes a "permanent" magnetic material that exhibits magnetism even when no electrical current is applied. Examples of suitable permanent magnetic materials include but are not limited to NdFeB, SmCo, and AlNiCo, composite materials such as AlNiCo in a plastic, and combinations comprising at least one of the foregoing materials.

In another exemplary embodiment, the magnetic ring includes a magnetic material that exhibits magnetism upon application of an electric current, such as a flux conducting material steel. The magnetic ring is coupled to an electrical supply that is switched on to allow a current to flow through the magnetic ring when it is desirable to create a magnetic field.

The magnetic ring is attached to a shaft through the use of an adaptor (shown later in FIG. 4) retained to the magnetic ring by, e.g., gluing, molding, or light press fitting. The adaptor includes a material suitable for affixing the magnetic, ring to the shaft. Non-brittle, low yield strength materials are particularly suitable for use in the adaptor. Examples of such materials include but are not limited to different grades of aluminum, different grades of steel, plastic, and combinations comprising at least one of the foregoing materials.

Figure 1:
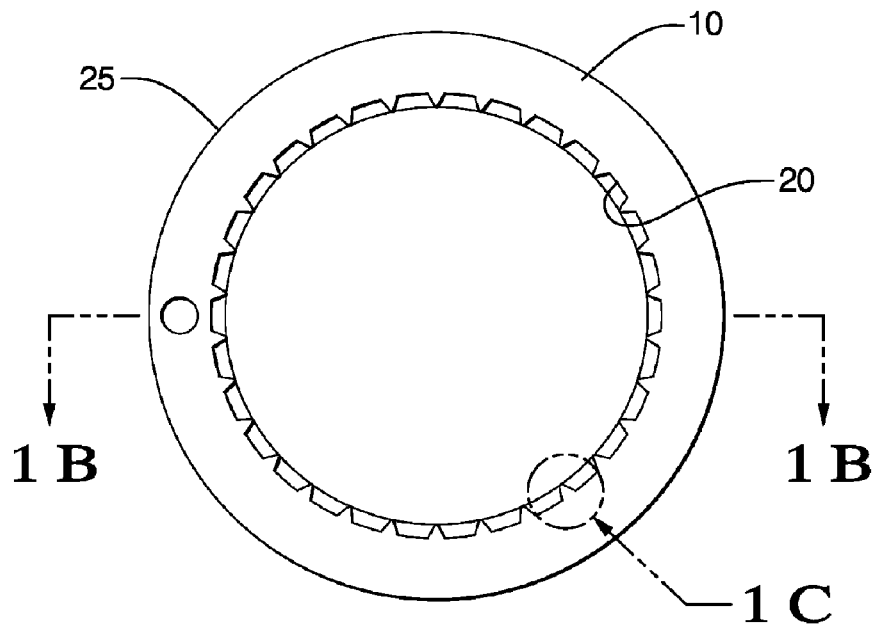
Figure 1:
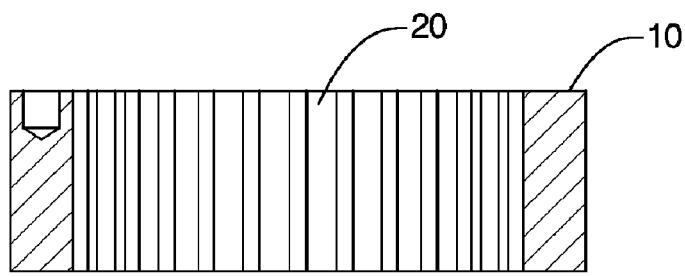
Figure 1:
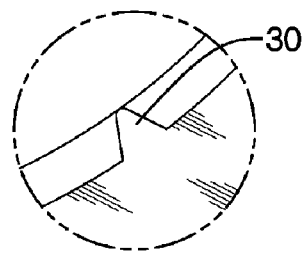

FIG. 1a depicts one embodiment of the adaptor, which includes a substantially annular body 10 sized and shaped to fit snugly against an inside wall of the magnetic ring. The body 10 has an inner wall 20 spaced from an outer wall 25. The inner wall 20 of the adaptor comprises a plurality of grooves or splines arranged radially about the inner wall 20 that act as an interface with the shaft. The grooves serve to reduce the stress and/or strain applied to the magnetic ring when it is assembled onto the shaft. The quantity and the geometry of the grooves are based on the desired magnet tensile strength and the desired interference between the adaptor and the shaft interface. The grooves can be formed using various methods such as machining, casting, extruding, stamping, and so forth. The presence of the grooves in inner wall 20 is more clearly seen in FIG. 1b, which depicts a cross-section B-B of FIG. 1a. A detailed view of one groove 30 is shown in FIG. 1c, which depicts section A of FIG. 1a. While the groove 30 is shown as being V-shaped, other shapes are contemplated such as rectangular shaped or U-shaped.

FIG. 2a depicts an alternative embodiment of the adaptor. This adaptor is also sized to fit snugly adjacent to an inside wall of the magnetic ring. A groove 50 extends partially around a circumference of the adaptor in between an inner wall 60 and an outer wall 70 to alleviate the stress and/or strain applied to the magnetic ring when it is placed upon the shaft. While the groove 50 is shown as extending completely around the circumference of the adaptor, it is understood that it could be separated into two or more segments that are spaced apart around the inner wall. The inner wall 60 and the outer wall 70 are spaced apart to transfer the stress and/or strain away from the magnetic ring. As shown more clearly in FIG. 2b, which depicts a cross-section A-A of FIG. 2a, the groove 50 is almost U-shaped or "cup" shaped. The groove 50 can be formed using various methods such as machining, casting, extruding, and stamping, with the stamping process being preferred. FIG. 2c, which depicts section B of FIG. 2b in more detail, reveals that the inner wall 60 also includes an undercut 90 to greatly reduce the stress and/or strain applied to the magnetic ring.

FIG. 3a depicts yet another embodiment of the adaptor, which is sized to fit against an inside wall of the magnetic ring. Again, the adaptor includes an outer wall 100 spaced from an inner wall 110. In this embodiment, the inner wall 110 includes six slots 120. It is understood that the number of slots could vary depending on, among other things, the size of the adaptor. The slots 120 are U-shaped or rectangular shaped as shown or may be presented in other similar shapes. The slots 120 serve as alignment features when assembling the adaptor on the shaft. For example, the slots can be aligned to an assembly tool used to assemble the different components, which is in turn aligned to another component on the shaft. The inner wall 110 also includes a plurality of grooves 130 or splines like those described previously, which provide an interference fit to a shaft. The grooves 130 serve to reduce the stress and/or strain applied to the magnetic ring when it is assembled onto the shaft. However, the use of the slots 120 is per certain assembly requirement and can adversely affect the stress and/or strain applied to the magnetic ring during assembly on the shaft. A detailed view of section A of FIG. 3a is shown in FIG. 3b, which reveals that each groove 130 can be V-shaped. It is contemplated that the slots 120 and the grooves 130 can also take the form of shapes other than those shown.

Figure 5:
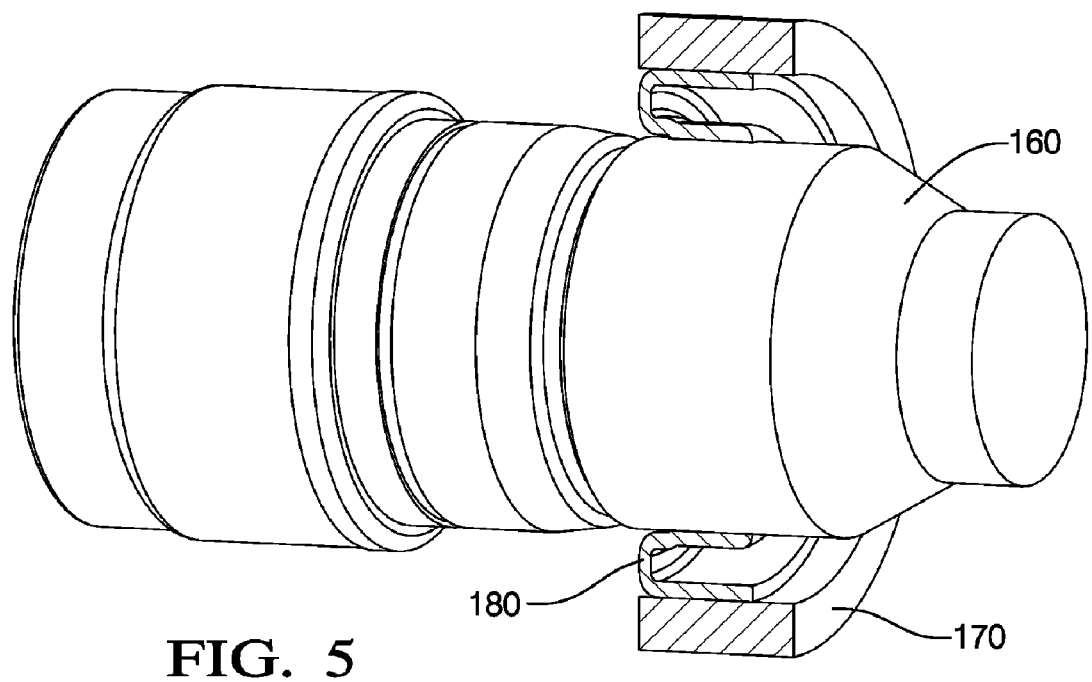
FIG. 5 is a cross-sectional view of the shaft assembly shown in FIG. 4.
Figure 6:
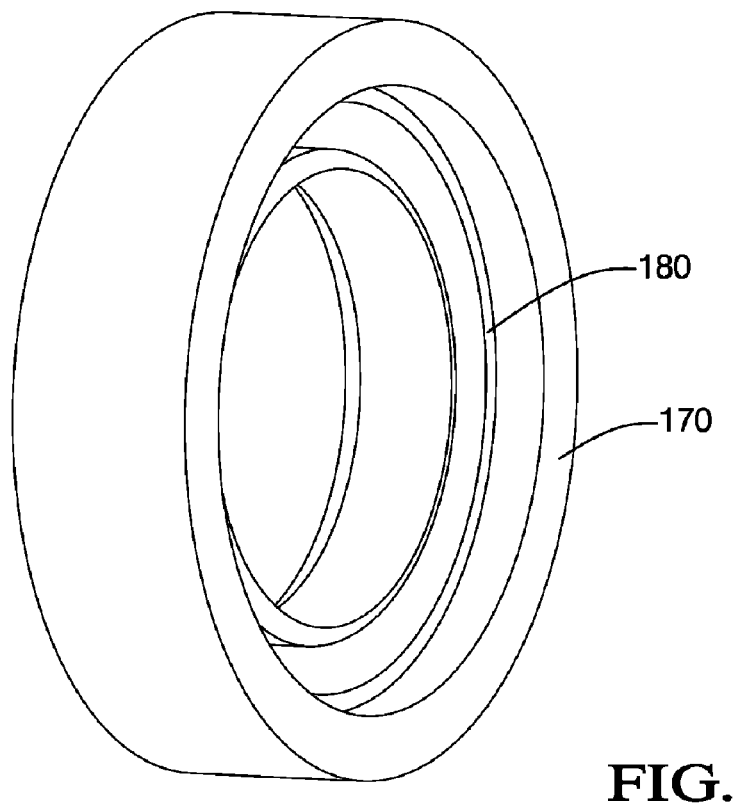
FIG. 6 is a perspective view of an adaptor attached to a magnetic ring.

The way in which the adaptor described above assists with attaching a magnetic ring to a shaft is better understood by turning now to FIGS. 4-6. FIGS. 4 and 5 depict perspective and cross-sectional views, respectively, of an embodiment of a shaft assembly. The shaft assembly includes a magnetic ring assembly 150 that surrounds a shaft 160. The magnetic ring assembly 150 includes a magnetic ring 170 and an adaptor 180 in accordance with an embodiment described herein. FIG. 6 shows the magnetic ring assembly in more detail. The adaptor 180 fits within the inner diameter of the: magnetic ring 170 and is attached to the ring 170. The adaptor is sized to fit tightly around the shaft 160 and thus assists holding the magnetic ring in place on the shaft 160. To place the magnetic ring assembly 150 in its desired position, a force is applied to slide it down the shaft 160. Once in its desired position, the adaptor 180 can press against the shaft 160 to prevent the movement of the magnetic ring assembly 150. The presence of the adaptor 180 reduces the stress and/or strain applied directly to the magnetic ring 170 and thus inhibits the brittle ring 170 from cracking under pressure.

As used herein, the terms "a" and "an" do not denote a limitation of quantity, but rather denote the presence of at least one of the referenced item. Moreover, the endpoints of all ranges directed to the same component or property are inclusive of the endpoints and are independently combinable (e.g., "about 5 wt. % to about 20 wt. %," is inclusive of the endpoints 5 and 20 and all values between 5 and 20). Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A magnetic ring system for attachment to a shaft comprising:
   a magnetic ring;
   an adaptor configured to fit inside the magnetic ring, the adaptor comprising an outer wall contacting the magnetic ring, an inner wall spaced from the outer wall by an end wall spanning therebetween, a groove between the inner wall and the outer wall and the inner wall having a first portion with a first inner diameter, an undercut portion having a second inner diameter and a third arcuate portion extending between said undercut portion and said end wall, the second inner diameter being different than the first inner diameter, and the undercut portion being positioned along the inner wall such that the undercut portion is configured to reduce the amount of stress exerted on the magnetic ring along the inner wall.

2. The magnetic ring system of claim 1, wherein the adaptor is configured to fit snugly around the shaft.

3. The magnetic ring system of claim 1, wherein the adaptor is substantially annular in shape and is retained to an inside wall of the magnetic ring.

4. A method for attaching the magnetic ring system of claim 3 to a shaft, comprising:
sliding the magnetic ring system down the shaft to its desired position; and
allowing the adaptor to press against the shaft to inhibit movement of the assembly.

5. The magnetic ring system of claim 1, wherein the groove extends completely around a circumference of the adaptor between the inner wall and the outer wall.

6. The magnetic ring system of claim 1, wherein the adaptor comprises aluminum, steel, a plastic, or a combination comprising at least one of the foregoing materials.

7. A method for forming the system of claim 1, comprising:
forming the groove in the adaptor such that the groove extends at least partially around a circumference of the adaptor between the inner wall and the outer wall; and
attaching the adaptor to the magnetic ring such that it fits snugly against an inside wall of the magnetic ring.

8. The method of claim 7, wherein said forming the groove comprises machining, casting, extruding, or stamping the groove in the adaptor.

9. The method of claim 7, wherein said attaching the adaptor to the magnetic ring comprises gluing, molding, or light press fitting the adaptor into its position.

10. The magnetic ring system of claim 1, wherein said second inner diameter is greater than said first inner diameter.

11. The magnetic ring system of claim 1, wherein said inner wall includes a flat portion extending radially outward from said first portion to said undercut portion.

12. The magnetic ring system for attachment to a shaft comprising:
a magnetic ring;
an adapter configured to fit inside the magnetic ring, the adaptor comprising an outer wall contacting the magnetic ring, an inner wall spaced from the outer wall by an end wall spanning therebetween, a groove between the inner wall and the outer wall and the inner wall having a first portion with a first inner diameter, an undercut portion having a second inner diameter and a third arcuate portion extending between said undercut portion and said end wall, the second inner diameter different than the first inner diameter, the groove extending from an open end to an inner portion of said end wall, said groove having a first annular dimension between said inner wall and said outer wall adjacent said open end, and said groove having a second annular dimension between said inner wall and said outer wall adjacent said end wall, said first annular dimension greater than said second annular dimension, and wherein the undercut portion is positioned along the inner wall such that the undercut portion is configured to reduce the amount of stress exerted on the magnetic ring along the inner wall.

13. The magnetic ring system of claim 12, wherein said second annular dimension transitions to said first annular dimension along a convex surface.

14. The magnetic ring system of claim 13, wherein the convex surface extends between said end wall and said inner wall.

* * * * *